United States Patent [19] [11] 4,040,586
Newsteder [45] Aug. 9, 1977

[54] AQUARIUM BRACKET ASSEMBLY

[76] Inventor: Robert Newsteder, 349 Irving Ave., South Orange, N.J. 07079

[21] Appl. No.: 704,360

[22] Filed: July 12, 1976

[51] Int. Cl.² ............................................. F16F 15/00
[52] U.S. Cl. .................................. 248/14; 248/225.3; 248/222.1
[58] Field of Search ........... 248/14, 16, 226 R, 226 A, 248/226 B, 226 D, 223, 224, 225; 267/208; 24/263 R, 263 PJ; 403/753 D

[56] References Cited

U.S. PATENT DOCUMENTS

| 231,126 | 8/1880 | Webb et al. | 248/226 B |
|---|---|---|---|
| 1,876,478 | 9/1932 | Duzer | 248/226 B |
| 2,006,897 | 7/1935 | Kirkland et al. | 248/226 B |
| 2,643,848 | 6/1953 | Hoffmann | 248/226 R |
| 3,695,256 | 10/1972 | Brower | 248/226 B |

FOREIGN PATENT DOCUMENTS

| 561,564 | 10/1957 | Belgium | 24/263 R |

Primary Examiner—Robert A. Hafer
Attorney, Agent, or Firm—Edward R. Weingram

[57] ABSTRACT

A bracket assembly for supporting a device such as an air pump along the side wall of an aquarium includes an upper support angle member having a platform extending outwardly from the upper end of the wall, a vertical member having a lower portion extending along the side of the wall and an upper end extending through the support angle platform, and a slidable locking member which engages the support angle platform and vertical member upper end to secure the members together. The support angle platform includes a pair of outwardly extending end posts which are received in holes in the base plate of an air pump to support the air pump in a vertical hanging position. The bracket is compact and readily assembled by hand, reduces vibration and creeping caused by the air pump, and positions the air pump above the water level in the aquarium to reduce back flow siphoning of the water. The bracket also includes holes to receive and position air line tubing connected from the air pump into the water.

10 Claims, 8 Drawing Figures

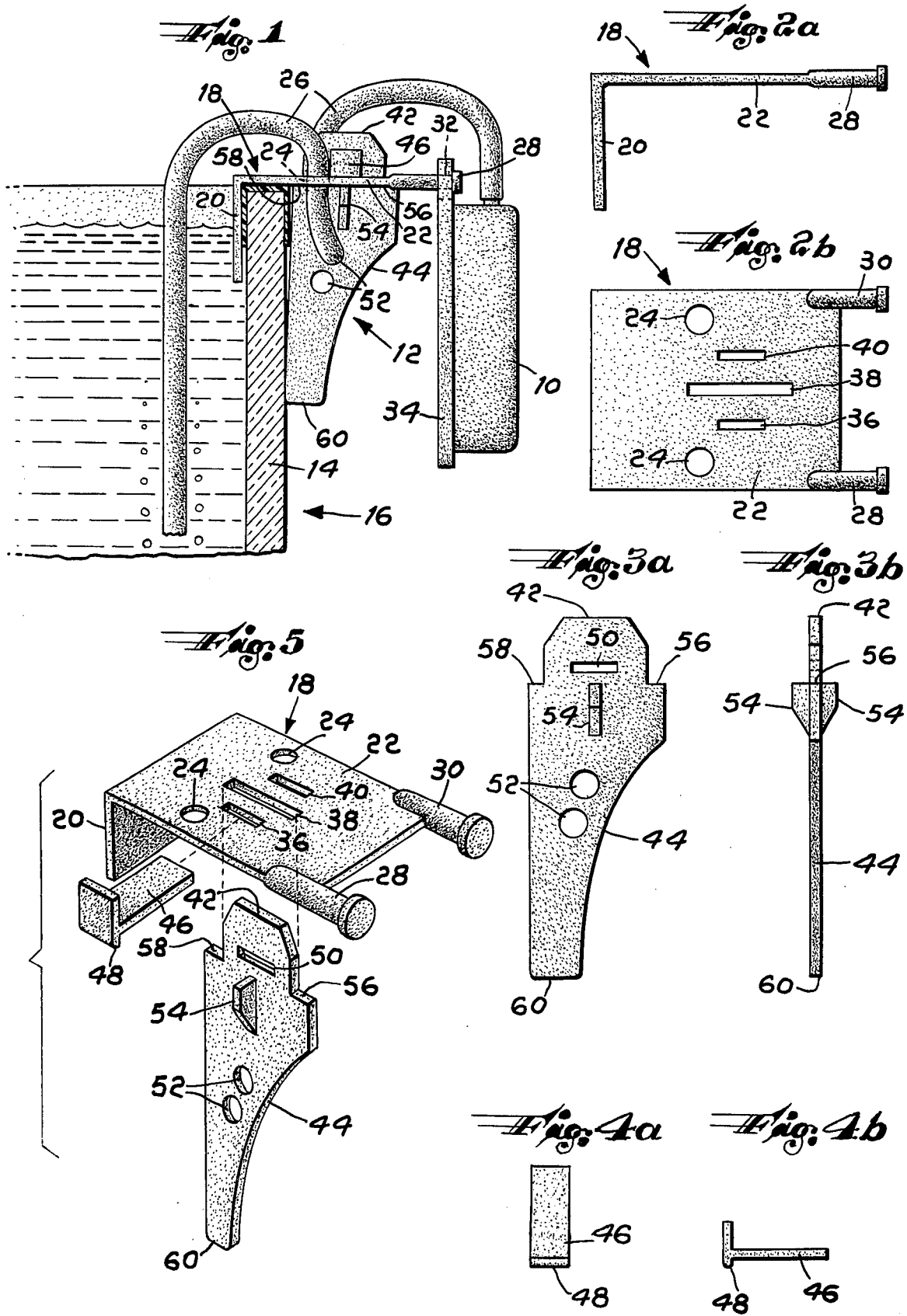

AQUARIUM BRACKET ASSEMBLY

BACKGROUND OF THE INVENTION

1. Field of the Invention

The present invention relates to a bracket for supporting devices along the side of a home aquarium and particularly to an easily assembled bracket which hangs over the upper end of an aquarium wall to support an air pump.

2. Description of the Prior Art

In the past, home aquarium air pumps and related devices have generally been placed on flat table surfaces alongside the fish tank with long connecting air line tubes leading over the tank walls into an air filter or other device in the water. The air pumps vibrate on the surfaces to cause undesired noise and also tend to move or creep from the original position. In addition, the high level of water in the tank may result in back flow siphoning to the lower air pump which can cause water damage. One attempted solution for some of these problems has been the use of a unitary bracket having a right angle portion which hooks over the edge of the tank wall and another reverse right angle portion extending downwardly along the wall and outwardly to form a horizontal ledge on which the air pump rests in a flat position. Another bracket, such as shown in U.S. Pat. No. 2,676,921, issued Apr. 27, 1954, forms the base suport for a motor and pump combination including an integral flexible hook that clamps directly over the wall. While these brackets raise the level of the air pump to shorten the air lines and reduce back flow, they do not adequately reduce vibration of the pump and cannot be readily disassembled into a compact size for packaging or storage.

SUMMARY OF THE INVENTION

It is therefore the primary object of the present invention to provide a simplified bracket for supporting devices along the side of a home type aquarium above the water level.

Another object is to provide a bracket that can be easily assembled or taken apart and which reduces vibration.

This is achieved with a bracket assembly of three elements including an upper support angle member having a flange extending along the inside wall of the aquarium and a platform extending outwardly over the upper edge of the wall, a vertical member having a lower portion extending along the outside of the wall and an upper end extending through the support angle platform, and a slidable locking member which engages the upper end of the vertical member and the support angle platform to fasten the elements together. The lower end of the vertical member rests against the side of the wall and the upper support angle platform includes two outwardly extending posts which are adapted to engage holes in the base plate of a device, such as an air pump, to hold the pump in a vertical hanging position. The posts provide a fixed support that eliminates creeping and the small dimensions of the posts minimize transmission of noise and reduce vibration from the air pump. The bracket suports the pump above the aquarium water level to reduce back flow siphoning and shorten the air line tubing leading into the water. The upper support and vertical members also include holes to receive and position the tubing. The entire assembly is compact and can be easily put together and taken apart. Other objects and advantages will become apparent from the following description in conjunction with the accompanying drawings.

BRIEF DESCRIPTION OF THE DRAWINGS

FIG. 1 is a pictorial side view of the bracket assembly shown mounted on an upper portion of a wall of an aquarium and supporting an air pump;

FIGS. 2a and 2b show side and top views of the upper support angle member;

FIGS. 3a and 3b show side and end views of the vertical member;

FIGS. 4a and 4b show top and end views of the locking member; and

FIG. 5 is an exploded isometric view showing the members in position for assembly.

DESCRIPTION OF THE PREFERRED EMBODIMENT

As shown in FIG. 1, an air pump 10 is supported on a bracket 12 alongside the vertical wall 14 of a home aquarium or fish tank 16. The bracket is formed of three separate elements that are readily assembled and secured together by hand. A first upper support angle member 18, as shown in further detail in FIGS. 2a and 2b, has an L-shaped configuration including a thin vertical flange 20 which is adapted to extend downwardly along the inside upper surface of wall 14, and a thin horizontal platform section 22 extending outwardly over the edge of the tank wall. The platform section 22 includes a pair of holes 24 which are adapted to receive and position air line tubing 26 connected between the air pump 10 and a filter unit or aerating device, not shown, at the bottom of the tank 16.

Extending from the outer end of platform 22 are a pair of small diameter posts 28, 30 which are adapted to engage a pair of holes 32 in the upper end of base plate 34 of air pump 10. The posts hold the air pump in a fixed position to prevent movement or creeping and also support the pump so that it hangs downward from the top of the tank along the outside wall 14. The relatively small dimensions of the posts provide a minimum area to transmit noise and vibration from the pump through the bracket to the tank and thus act to reduce this undesirable sound.

Adjacent the holes 24 in the platform 22 are three parallel slots 36, 38, 40 which extend along a portion of the length of the platform. The length and width of the longer center slot 38 accommodates the upper end 42 of the second vertical member 44, which is shown in further detail in FIGS. 3a and 3b. Slots 36, 40 are adapted to engage the third L-shaped slidable locking member 46 which is shown in further detail in FIGS. 4a and 4b. A detent 48 extending from the bottom of the intersecting sections of locking member 46 can be received in either slot 36 or 40 depending upon the direction in which the locking member 46 is inserted into a horizontal slot 50 in the end 42 of vertical member 44.

The vertical member 44 also includes a pair of holes 52 which together with holes 24 in the upper support angle member 18 receive and hold the air line tubing 26 in a desired position. A pair of wedge shaped bracing projections 54 on opposite sides of the vertical member 44 provide added support and prevent excessive lateral movement when the upper end 42 of the vertical member fits through and engages slot 38 of upper platform section 22. In this position, the horizontally extending outer edges 56, 58 and upper surfaces of wedges 54 abut the lower surface of platform 22 to provide a stable support. The lower end 60 of vertical member 44 extends downwardly along the outside of the tank wall 14 and rests against the vertical wall at a slight angle.

The three separated bracket elements 18, 44 and 46 may be readily packaged together compactly in a common container with the air pump and then easily assembled by hand for use. As shown in FIG. 5, the upper end 42 of vertical member 44 is inserted through longitudinal slot 38 in upper support angle member 18 until outer edges 56, 58 and the upper surfaces of wedges 54 abut the lower surface of platform 22. Locking member 46 is then inserted laterally through horizontal slot 50 in the upper end 42 of the vertical member. The lower edge of slot 50 is aligned with the upper surface of platform 22 and the upper edge is positioned above the surface. This permits locking member 46 to slide along the upper surface of platform 22 through the slot 50 until the detent 48 extending from the lower surface of the locking member engages slot 36, or slot 40 if inserted in the reverse direction, in platform 22. Once this is in place, the bracket assembly is complete and securely fastened.

The air pump 10 may then be positioned so that the holes 32 in the base plate 34, which is preferably of a resilient rubber material, engage posts 28, 30. The forward edges of the posts have wider rims which hold the air pump in position hanging downwardly. The flange 20 of the upper support member 18 may then be placed over the edge long the inside of tank wall 14 while the lower end 60 of vertical member 44 rests against the outside surface of wall 14. The air line tubing 26 may also be connected at this time, or earlier following the assembly of the bracket. The tubing is connected from the upper end of the pump and may be inserted through one hole 24 in the upper support platform 22, then through one hole 52 in the vertical member 44 and finally through the second hole 24 in platform 22 and looped over the edge of the tank into the water to connect to a filter unit therein. The bracket thus provides a double loop for the tubing and holds the tubing and air pump in a fixed position above the level of the water to effectively prevent back flow siphoning of the water and permits use of shortened lines.

The bracket is preferably made of a strong thin flexible plastic material such as a high impact styrene or a linear polyethylene. Typical dimensions may be about 2 to 3 inches in length for the vertical member and upper support angle platform, about 2 inches in width for the platform, and 1 inch in length for the flange. The locking member may be about 1 inch long and one-fourth inch in height. The novel bracket thus provides a support structure for aquarium devices that is easily assembled or taken apart, provides reduced noise and vibration, eliminates creeping, and avoids back flow of water. While only a single embodiment has been illustrated and described, it is apparent that many variations may be made in the design and configuration without departing from the scope of the invention as set forth in the appended claims.

What is claimed is:

1. A bracket assembly comprising: an upper support angle member having a downwardly extending flange and an outwardly extending platform section, said platform section including a plurality of coplanar openings through the common wall of said platform, and support means projecting from the outer end of said platfrom; a generally vertical member having an upper end engageable with said upper support angle member through one of said openings in said platform section and a downwardly extending lower end, said upper end including an opening there-through positioned adjacent the upper surface of said platform section upon engagement with said upper support member, and a slidable locking member having one end engageable with said vertical member through said opening in said upper end and a downward projection engageable with another of said openings in said upper support member platform section, said locking member securing said vertical member to said upper support member upon said engagement.

2. The assembly of claim 1 wherein said support means projecting from said outer end includes a pair of posts.

3. The assembly of claim 1 wherein said plurality of openings in said platform section include a first longitudinal slot receiving said upper end of said vertical member upon said engagement and a second longitudinal slot receiving said projection from said locking member, said locking member extending laterally through said opening in said upper end.

4. The assembly of claim 3 wherein said platform section extends substantially horizontally and said vertical member includes bracing projections abutting the lower surface of said platform section upon said engagement with said upper support member.

5. The assembly of claim 4 wherein said downwardly extending flange is substantially perpendicular to said platform section and said vertical member is spaced along said platform from said flange.

6. Apparatus for supporting an air pump on an aquarium wall comprising: a bracket assembly including an upper support angle member having a downwardly extending flange and an outwardly extending platform section positionable over the upper edge of an aquarium wall, said platform section including a plurality of coplanar openings through the common wall of said platform, and suport means projecting from the outer end of said platform section for engaging and supporting an air pump along said wall; a generally vertical member having an upper end engageable with said upper support angle member through one of said openings in said platform section and a downwardly extending lower end which rests against said wall when said bracket is positioned over said wall, said upper end including an opening therethrough positioned adjacent the upper surface of said platform section upon engagement with said upper support member; and a slidable locking member having one end engageable with said vertical member through said opening in said upper end and a downward projection engageable with another of said openings in said upper support member platform section, said locking member securing said vertical member to said upper support member upon said engagement.

7. Apparatus according to claim 6 wherein said support means projecting from said outer end includes a pair of integral spaced posts adapted to engage and support said air pump.

8. Apparatus according to claim 6 wherein said vertical member and said upper support angle platform section openings include holes adapted to receive and position air line tubing connected to said air pump.

9. A bracket for supporting an article adjacent the upper edge of a vertical wall comprising: an upper support angle member having a downwardly extending flange and an outwardly extending platform section including a pair of spaced support members integral with and projecting from the outer end of said platform, said spaced support members having raised edges for engaging and holding said article; and a generally vertical member extending downwardly from said platform section between said flange and said spaced support members, said flange and vertical members being positionable on opposite sides of said wall with the underside of said platform adapted to rest on the edge of said wall.

10. The bracket according to claim 9 wherein said platform and vertical members include a plurality of holes adapted to receive and position a tubular member extending from said article.

* * * * *